Figure 1:
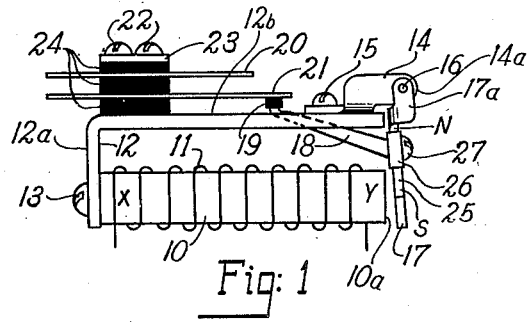

March 17, 1942.  C. P. CLARE ET AL  2,276,535
CONTROL DEVICE
Filed Sept. 30, 1938

INVENTORS
Carl P. Clare
Irvin W. Cox
BY Davis, Lindsey, Smith & Shonts
ATTORNEYS Patented Mar. 17, 1942

2,276,535

UNITED STATES PATENT OFFICE 2,276,535

CONTROL DEVICE

Carl P. Clare, Park Ridge, Ill., and Irvin W. Cox, Milwaukee, Wis., assignors to Associated Electric Laboratories, Inc., Chicago, Ill., a corporation of Delaware Application September 30, 1938, Serial No. 232,646

6 Claims. (Cl. 175—339)

The present invention relates to control devices and more particularly to improvements in control devices of the polarized electromagnetic type.

It is an object of the present invention to provide an improved electromagnetic control device of the polarized type which is of rugged and economical construction and which operates in a reliable and positive manner.

Another object of the invention is to provide a polarized electromagnetic control device comprising a magnetic field structure including a permanent magnet, which embodies an improved arrangement for preventing demagnetization of the permanent magnet during the course of operation thereof.

A further object of the invention is to provide a polarized electromagnetic control device comprising a magnetic field structure including an armature movable between a normal position and an operated position and an operating winding for controlling the position of the armature, which embodies an improved arrangement utilizing a permanent magnet for returning the armature to its normal position subsequent to the operation of the device.

In brief, the objects set forth above are in part realized in accordance with one feature of the present invention by providing a control device comprising a magnetic field structure having an operating winding electromagnetically associated therewith and including a field element, a movable armature element associated with the field element and a permanent bar magnet carried by one of the elements, wherein the one element and the permanent magnet carried thereby are so constructed and arranged that the portion of the one element adjacent the permanent magnet positively prevents demagnetization of the permanent magnet when the operating winding is energized to produce a magnetic flux in the one element which is in opposition to the magnetic flux produced therein by the permanent magnet. In accordance with one embodiment of the invention, the permanent magnet is directly secured to the armature element; and in accordance with another embodiment of the invention, the permanent magnet is directly secured to the field element.

In accordance with another feature of the invention, the field structure includes first and second field elements, a permanent magnet and an armature element movable between the field elements; and operating and polarizing windings are electromagnetically associated with the field structure. The field structure is so constructed and arranged that the armature element is normally biased toward the second field element and is moved toward the first field element when the operating winding is energized with current of one polarity; and that the armature is returned toward the second field element by an arrangement including the permanent magnet when the operating winding is deenergized. In accordance with one embodiment of the invention, the permanent magnet is directly secured to the armature element; and in accordance with another embodiment of the invention, the permanent magnet is directly secured to the second field element.

Figure 2:
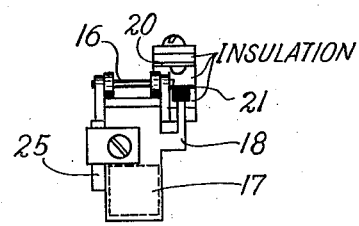
Figure 3:
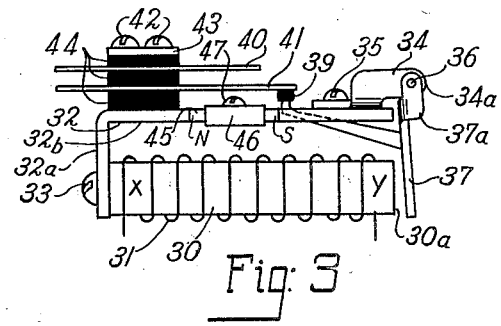
Figure 4:
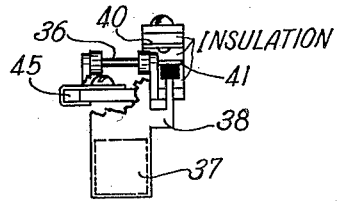
Figure 5:
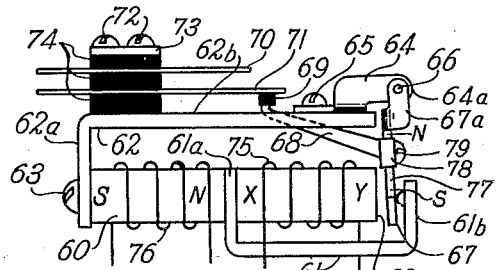
Figure 6:
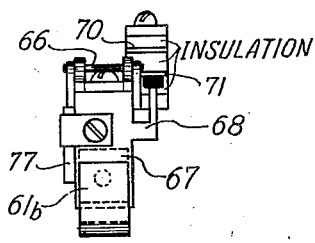
Figure 7:
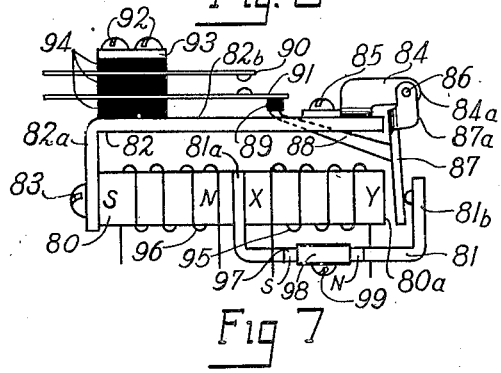
Figure 8:
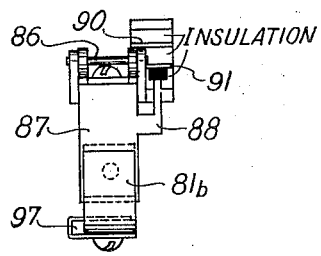

The novel features believed to be characteristic of the invention are set forth with particularity in the appended claims. The invention, both as to its organization and method of operation, together with further objects and advantages thereof, will best be understood by reference to the following specification taken in connection with the accompanying drawing, in which Figure 1 is a side elevational view of a polarized electromagnetic control device embodying the present invention; Fig. 2 is an end elevational view of the control device shown in Fig. 1; Fig. 3 is a side elevational view of a modified form of the polarized electromagnetic control device; Fig. 4 is an end elevational view, partly broken away, of the control device shown in Fig. 3; Fig. 5 is a side elevational view of another modified form of the polarized electromagnetic control device; Fig. 6 is an end elevational view of the control device shown in Fig. 5; Fig. 7 is a side elevational view of a further modified form of the polarized electromagnetic control device; and Fig. 8 is an end elevational view of the control device shown in Fig. 7.

Referring now to Figs. 1 and 2 of the drawing, the control device there shown comprises a magnetic field structure including a field element or core 10 provided with an operating winding indicated at 11 electromagnetically associated therewith and a substantially L-shaped field element 12, one leg 12a of which is secured to one end of the core by a screw 13. The other leg 12b of the field element 12 extends substantially parallel to the core 10 and carries a bracket 14 adjacent the outer end thereof, the bracket being secured to the leg 12b by a screw 15. The bracket 14 is provided with two upwardly and outwardly extending arms 14a arranged in spaced parallel relationship and between which a pin 16 extends. An armature element 17 is associated with a pole face indicated at 10a of the core 10 and provided with two upwardly extending arms 17a, arranged in spaced parallel relationship, which are pivotally secured to the pin 16. Also the armature 17 carries a rearwardly extending arm 18 provided with an insulating button 19 disposed on the outer end thereof. Apparatus comprising a contact spring assembly including a pair of cooperating contact springs 20 and 21 is secured to the leg 12b of the field element 12 by an arrangement comprising two screws 22 and a clamping washer 23. The contact springs 20 and 21 are insulated from each other and from the clamping washer 23 and the leg 12b of the field element 12 by a number of insulating plates 24, one of these insulating plates being arranged between each two of these elements.

The insulating button 19 disposed on the outer end of the arm 18 directly engages the contact spring 21 and is adapted to move this contact spring into engagement with the contact spring 20 in order to complete an electric circuit including the pair of contact springs 20 and 21 when the armature 17 is rotated in a clockwise direction, as viewed in Fig. 1, about the pivot pin 16. Also it is noted that the contact spring 21 is formed of resilient material and is biased away from the contact spring 20, thereby to interrupt the electric circuit including this pair of contact springs and to bias the armature 17 in a counterclockwise direction about the pivot pin 16 away from the pole face 10a into a normal position.

A permanent bar magnet 25 is directly secured in intimate contact with one edge of the armature 17 by an arrangement comprising a strap 26 and a screw 27. The permanent bar magnet 25 is formed of a material having relatively high magnetic permeability and retentivity such, for example, as the alloys sold commercially under the names "Alnico" or "Nipermag." The permanent bar magnet 25 is so arranged that a south pole thereof is disposed adjacent the pole face 10a of the core 10 and a north pole thereof is disposed adjacent the outer end of the leg 12b of the field element 12.

When the control device occupies a normal or non-operated position, the armature 17 is biased away from the pole face 10a of the core 10 due to the resiliency of the contact spring 21. Also, the permanent bar magnet 25 sets up a magnetic flux which traverses two parallel magnetic paths. One of these parallel magnetic paths extends from the north pole of the permanent bar magnet 25 by way of a portion of the armature 17, the legs 12b and 12a of the field element 12, the core 10 and another portion of the armature 17 to the south pole of the permanent bar magnet. The other of these parallel magnetic paths extends from the north pole of the permanent bar magnet 25 by way of the adjacent portion of the armature 17 to the south pole of the permanent bar magnet, this magnetic path constituting a short-circuiting magnetic path for the permanent bar magnet. It is noted that the permanent bar magnet 25 has a sufficiently high permeability that a considerable magnetic flux traverses the first-mentioned parallel magnetic path in spite of the fact that the second-mentioned parallel magnetic path constitutes a short-circuiting magnetic path for the permanent bar magnet.

The terminals of the operating winding 11 are connected to a suitable source of direct current supply, thereby to cause this winding to be energized. When the operating winding 11 is thus energized, a magnetic flux is set up in the core 10 which causes the end thereof, adjacent the pole face 10a, to assume a predetermined polarity Y and the end thereof, adjacent the leg 12a of the field element 12, to assume a predetermined polarity X, the polarities X and Y being respectively north and south poles when the operating winding is energized with a current of one polarity and the polarities X and Y being respectively south and north poles when the operating winding is energized with a current of the opposite polarity. When the operating winding 11 is energized with a current of one polarity so that the polarity Y of the core 10 is a north pole, a magnetic flux traverses the field structure over a magnetic path extending from the north pole Y of the core 10 by way of the armature 17 and the legs 12b and 12a of the field element 12 to the south pole X of the core. It is noted that this magnetic flux traverses the magnetic field structure in the same direction as the magnetic flux produced by the permanent bar magnet 25. These accumulative magnetic fluxes are effective to cause the armature 17 to be attracted to the pole face 10a of the core 10, thereby to rotate the armature 17 in a clockwise direction about the pivot pin 16. When the armature 17 is rotated in a clockwise direction about the pivot pin 16, the insulating button 19 carried by the arm 18 moves the resilient contact spring 21 into engagement with the contact spring 20, thereby to complete the electric circuit including this pair of contact springs.

On the other hand, when the operating winding 11 is energized with a current of the opposite polarity so that the polarity Y of the core 10 is a south pole, a magnetic flux traverses the field structure over a magnetic path extending from the north pole X of the core 10 by way of the legs 12a and 12b of the field element 12 and the armature 17 to the south pole Y of the core. It is noted that this magnetic flux traverses the magnetic field structure in a direction opposite to that of the magnetic flux produced by the permanent bar magnet 25. These opposing magnetic fluxes are ineffective to cause the armature 17 to be attracted to the pole face 10a of the core 10. Thus, the armature 17 is not rotated in a clockwise direction about the pivot pin 16 to move the contact spring 21 into engagement with the contact spring 20. Thus, it will be understood that the control device is of the polarized type and is operative only in the event the operating winding 11 thereof is energized with a current of a predetermined polarity, the position of the armature 17 with respect to the core 10 being controlled in accordance with the algebraic sum of the fluxes traversing these elements.

Moreover, it is noted that, when the operating winding 11 is energized with a current of the opposite polarity effective to cause the polarity Y of the core 10 to be a south pole, the magnetic flux produced thereby and traversing the armature 17 of the field structure is by-passed around the permanent bar magnet 25 by way of the portion of the armature 17 adjacent the permanent bar magnet. Thus, this magnetic flux opposing the magnetic flux produced by the permanent bar magnet 25 is not forced through the permanent bar magnet. Accordingly, there is substantially no tendency for the permanent bar magnet 25 to become demagnetized, when the fluxes produced by the operating winding 11 and the permanent bar magnet 25 traverse the field structure in opposite directions or opposite each other. Hence, the portion of the armature 17 disposed adjacent the permanent bar magnet 25 is effective to prevent demagnetization of the permanent bar magnet when the operating winding 11 is energized with a current of the opposite polarity effective to cause this winding to produce a flux in the field structure in opposition to that produced therein by the permanent bar magnet 25.

In Figs. 3 and 4 of the drawing a modified form of the control device is shown which comprises a magnetic field structure including a field element or core 30 provided with an operating winding indicated at 31 electromagnetically associated therewith and a substantially L-shaped field element 32, one leg 32a of which is secured to one end of the core by a screw 33. The other leg 32b of the field element 32 extends substantially parallel to the core 30 and carries a bracket 34 adjacent the outer end thereof, the bracket being secured to the leg 32b by a screw 35. The bracket 34 is provided with two upwardly and outwardly extending arms 34a arranged in spaced parallel relationship and between which a pin 36 extends. An armature element 37 is associated with a pole face indicated at 30a of the core 30 and provided with two upwardly extending arms 37a, arranged in spaced parallel relationship, which are pivotally secured to the pin 36. Also the armature 37 carries a rearwardly extending arm 38 provided with an insulating button 39 disposed on the outer end thereof. Apparatus comprising a contact spring assembly including a pair of cooperating contact springs 40 and 41 is secured to the leg 32b of the field element 32 by an arrangement comprising two screws 42 and a clamping washer 43. The contact springs 40 and 41 are insulated from each other and from the clamping washer 43 and the leg 32b of the field element 32 by a number of insulating plates 44, one of these insulating plates being arranged between each two of these elements.

The insulating button 39 disposed on the outer end of the arm 38 directly engages the contact spring 41 and is adapted to move this contact spring into engagement with the contact spring 40 in order to complete an electric circuit including the pair of contact springs 40 and 41 when the armature 37 is rotated in a clockwise direction, as viewed in Fig. 3, about the pivot pin 36. Also it is noted that the contact spring 41 is formed of resilient material and is biased away from the contact spring 40, thereby to interrupt the electric circuit including this pair of contact springs and to bias the armature 37 in a counterclockwise direction about the pivot pin 36 away from the pole face 30a into a normal position.

A permanent bar magnet 45 is directly secured in intimate contact with one edge of the leg 32b of the field element 32 by an arrangement comprising a strap 46 and a screw 47. The permanent bar magnet 45 is formed of a material having relatively high magnetic permeability and retentivity such, for example, as the alloys previously named. The permanent bar magnet 45 is so arranged that a south pole thereof is directed toward the outer end of the leg 32b of the field element 32 and a north pole thereof is directed toward the leg 32a of the field element 32.

When the control device occupies a normal or non-operated position, the armature 37 is biased away from the pole face 30a of the core 30 due to the resiliency of the contact spring 41. Also, the permanent bar magnet 45 sets up a magnetic flux which traverses two parallel magnetic paths. One of these parallel magnetic paths extends from the north pole of the permanent bar magnet 45 by way of a portion of the leg 32b of the field element 32, the leg 32a thereof, the core 30, the armature 37 and another portion of the leg 32b to the south pole of the permanent bar magnet. The other of these parallel magnetic paths extends from the north pole of the permanent bar magnet 45 by way of the adjacent portion of the leg 32b of the field element 32 to the south pole of the permanent bar magnet, this magnetic path constituting a short-circuiting magnetic path for the permanent bar magnet. It is noted that the permanent bar magnet 45 has a sufficiently high permeability that a considerable magnetic flux traverses the first-mentioned parallel magnetic path in spite of the fact that the second-mentioned parallel magnetic path constitutes a short-circuiting magnetic path for the permanent bar magnet.

The terminals of the operating winding 31 are connected to a suitable source of direct current supply, thereby to cause this winding to be energized. When the operating winding 31 is thus energized, a magnetic flux is set up in the core 30 which causes the end thereof, adjacent the pole face 30a, to assume a predetermined polarity Y and the end thereof, adjacent the leg 32a of the field element 32, to assume a predetermined polarity X, the polarities X and Y being respectively north and south poles when the operating winding is energized with a current of one polarity, and the polarities X and Y being respectively south and north poles when the operating winding is energized with a current of the opposite polarity. When the operating winding 31 is energized with a current of one polarity so that the polarity Y of the core 30 is a north pole, a magnetic flux traverses the field structure over a magnetic path extending from the north pole Y of the core 30 by way of the armature 37 and the legs 32b and 32a of the field element 32 to the south pole X of the core. It is noted that this magnetic flux traverses the magnetic field structure in the same direction as the magnetic flux produced by the permanent bar magnet 45. These accumulative magnetic fluxes are effective to cause the armature 37 to be attracted to the pole face 30a of the core 30, thereby to rotate the armature 37 in a clockwise direction about the pivot pin 36. When the armature 37 is rotated in a clockwise direction about the pivot pin 36, the insulating button 39 carried by the arm 38 moves the resilient contact spring 41 into engagement with the contact spring 40, thereby to complete the electric circuit including this pair of contact springs.

On the other hand, when the operating winding 31 is energized with a current of the opposite polarity so that the polarity Y of the core 30 is a south pole, a magnetic flux traverses the field structure over a magnetic path extending from the north pole X of the core 30 by way of the legs 32a and 32b of the field element 32 and the armature 37 to the south pole Y of the core. It is noted that this magnetic flux traverses the magnetic field structure in a direction opposite to that of the magnetic flux produced by the permanent bar magnet 45. These opposing magnetic fluxes are ineffective to cause the armature 37 to be attracted to the pole face 30a of the core 30. Thus, the armature 37 is not rotated in a clockwise direction about the pivot pin 36 to move the contact spring 41 into engagement with the contact spring 40. Thus, it will be understood that this control device is of the polarized type and is operative only in the event the operating winding 31 thereof is energized with a current of a predetermined polarity, the position of the armature 37 with respect to the core 30 being controlled in accordance with the algebraic sum of the fluxes traversing these elements.

Moreover, it is noted that when the operating winding 31 is energized with a current of the opposite polarity effective to cause the polarity Y of the core 30 to be a south pole, the magnetic flux produced thereby and traversing the leg 32b of the field element 32 of the field structure is by-passed around the permanent bar magnet 45 by way of the portion of the leg 32b adjacent the permanent bar magnet. Thus, this magnetic flux opposing the magnetic flux produced by the permanent bar magnet 45 is not forced through the permanent bar magnet. Accordingly, there is substantially no tendency for the permanent bar magnet 45 to become demagnetized, when the fluxes produced by the operating winding 31 and the permanent bar magnet 45 traverse the field structure in opposite directions or oppose each other. Hence, the portion of the leg 32b of the field element 32 disposed adjacent the permanent bar magnet 45 is effective to prevent demagnetization of the permanent bar magnet when the operating winding 31 is energized with a current of the opposite polarity effective to cause this winding to produce a flux in the field structure in opposition to that produced therein by the permanent bar magnet 45.

In Figs. 5 and 6 of the drawing another modified form of the control device is shown which comprises a magnetic field structure including a field element or core 60, a substantially U-shaped field element 61, one leg 61a of which is secured to the core 60 intermediate the ends thereof, and a substantially L-shaped field element 62, one leg 62a of which is secured to one end of the core by a screw 63. The other leg 61b of the field element 61 is arranged in spaced relationship with respect to a pole face indicated at 60a of the core 60 and the other leg 62b of the field element 62 extends substantially parallel to the core 60 and carries a bracket 64 adjacent the outer end thereof, the bracket being secured to the leg 62b by a screw 65. The bracket 64 is provided with two upwardly and outwardly extending arms 64a arranged in spaced parallel relationship and between which a pin 66 extends. An armature element 67 is arranged between the pole face 60a of the core 60 and the leg 61b of the field element 61 and is provided with two upwardly extending arms 67a arranged in spaced parallel relationship which are pivotally secured to the pin 66. Also the armature 67 carries a rearwardly extending arm 68 provided with an insulating button 69 disposed on the outer end thereof. Apparatus comprising a contact spring assembly including a pair of cooperating contact springs 70 and 71 is secured to the leg 62b of the field element 62 by an arrangement comprising two screws 72 and a clamping washer 73. The contact springs 70 and 71 are insulated from each other and from the clamping washer 73 and the leg 62b of the field element 62 by a number of insulating plates 74, one of these insulating plates being arranged between each two of these elements.

The insulating button 69 disposed on the outer end of the arm 68 directly engages the contact spring 71 and is adapted to move this contact spring into engagement with the contact spring 70 in order to complete an electric circuit including the pair of contact springs 70 and 71 when the armature 67 is rotated in a clockwise direction, as viewed in Fig. 5, about the pivot pin 66. Also it is noted that the contact spring 71 is formed of resilient material and is biased away from the contact spring 70, thereby to interrupt the electric circuit including this pair of contact springs and to bias the armature 67 in a counterclockwise direction about the pivot pin 66 away from the pole face 60a into a normal position.

An operating winding and a polarizing winding, respectively indicated at 75 and 76, are electromagnetically associated with the core 60, the operating winding 75 being associated with the core 60 between the pole face 60a thereof and the leg 61a of the field element 61, and the polarizing winding 76 being associated with the core 60 between the leg 61a of the field element 61 and the leg 62a of the field element 62.

A permanent bar magnet 77 is directly secured in intimate contact with one edge of the armature 67 by an arrangement comprising a strap 78 and a screw 79. The permanent bar magnet 77 is formed of a material having relatively high magnetic permeability and retentivity such, for example, as the alloys previously named. The permanent bar magnet 77 is so arranged that a south pole thereof is disposed adjacent the pole face 60a of the core 60 and a north pole thereof is disposed adjacent the outer end of the leg 62b of the field element 62.

The terminals of the polarizing winding 76 are connected to a suitable source of direct current supply, thereby to cause this winding to be energized. The polarity of this source of direct current supply is such that when the polarizing winding 76 is thus energized, a magnetic flux is set up in the core 60 which causes the portion thereof adjacent the leg 61a to assume the polarity of a north pole and the portion thereof adjacent the leg 62a to assume the polarity of a south pole, thereby to cause a magnetic flux to traverse the field structure over a magnetic path extending from the north pole of the core 60 by way of the leg 61a, the leg 61b, the armature 67, the leg 62b and the leg 62a to the south pole of the core. Also the permanent bar magnet sets up a magnetic flux which traverses two parallel magnetic paths. One of these parallel magnetic paths extends from the north pole of the permanent bar magnet 77 by way of a portion of the armature 67, the legs 62b and 62a, a portion of the core 60, the legs 61a and 61b and another portion of the armature 67 to the south pole of the permanent bar magnet. The other of these parallel magnetic paths extends from the north pole of the permanent bar magnet 77 by way of the adjacent portion of the armature 67 to the south pole of the permanent bar magnet, this magnetic path constituting a short-circuiting magnetic path for the permanent bar magnet. It is noted that the permanent bar magnet 77 has a sufficiently high permeability that a considerable magnetic flux produced thereby traverses the first-mentioned parallel magnetic path in spite of the fact that the second-mentioned parallel magnetic path constitutes a short-circuiting magnetic path for the permanent bar magnet. Also, it is noted that the magnetic flux produced by the polarizing winding 76 traverses the magnetic field structure in the same direction as the magnetic flux produced by the permanent bar magnet 77. These accumulative magnetic fluxes are effective to cause the armature 67 to be attracted to the leg 61b of the field element 61, thereby to bias the armature 67 in a counterclockwise direction about the pivot pin 66 away from the pole face 60a and into engagement with the leg 61b. Also, the armature 67 is biased away from the pole face 60a and into engagement with the leg 61b due to the resiliency of the contact spring 71. Accordingly, when the control device occupies a normal or non-operated position, the armature 67 is biased away from the pole face 60a of the core 60 into engagement with the leg 61b of the field element 61.

The terminals of the operating winding 75 are connected to a suitable source of direct current supply, thereby to cause this winding to be energized. When the operating winding is thus energized, a magnetic flux is set up in the core 60 which causes the end thereof, adjacent the pole face 60a, to assume a predetermined polarity Y and the portion thereof, adjacent the leg 61a, to assume a predetermined polarity X, the polarities X and Y being respectively north and south poles when the operating winding is energized with a current of one polarity, and the polarities X and Y being respectively south and north poles when the operating winding is energized with a current of the opposite polarity. When the operating winding 75 is energized with a current of one polarity so that the polarity Y of the core 60 is a north pole, a magnetic flux traverses the field structure over a magnetic path extending from the north pole Y of the core 60 by way of the armature 67, the legs 62b and 62a of the field element 62 and the portion of the core 60 disposed between the legs 62a and 61a to the south pole X of the core. It is noted that this magnetic flux traverses the core 60 in the same direction as the magnetic flux produced by the polarizing winding 76. These accumulative magnetic fluxes are effective to cause the armature 67 to be attracted to the pole face 60a of the core 60, thereby to rotate the armature 67 in a clockwise direction about the pivot pin 66. When the armature 67 is rotated in a clockwise direction about the pivot pin 66 the insulating button 69 carried by the arm 68 moves the resilient contact spring 71 into engagement with the contact spring 70, thereby to complete the electric circuit including this pair of contact springs.

It is noted that when the armature 67 occupies a non-operated position the polarizing winding 76 produces a magnetic flux which is effective to bias the armature 67 in a counter-clockwise direction about the pivot pin 66 away from the pole face 60a and into engagement with the leg 61b of the field element 61. On the other hand, when the armature 67 is rotated in a clockwise direction about the pivot pin 66 away from the leg 61b of the field element 61 and into engagement with the pole face 60a, the flux produced by the polarizing winding 76 is effective to bias the armature 67 into engagement with the pole face 60a away from the leg 61b of the field element 61. Thus, the polarizing winding 67 produces a flux which biases the armature 67 toward the pole face 60a or toward the leg 61b of the field element 61 depending upon the one of these elements toward which the armature 67 is moved.

When the operating winding 75 is deenergized the flux produced by the polarizing winding 76 is insufficient to retain the armature 77 in its operated position against the bias of the resilient contact spring 71. Accordingly, the armature 67 is rotated in a counterclockwise direction about the pivot pin 66 away from the pole face 60a and into engagement with the leg 61b of the field element 61. At this time the device occupies a non-operated position.

On the other hand, when the operating winding 75 is energized with a current of the opposite polarity so that the polarity Y of the core 60 is a south pole, a magnetic flux is produced which traverses the field structure over a magnetic path extending from the north pole X of the core 60 by way of the portion of the core 60 disposed between the leg 62a of the field element 62 and the leg 61a of the field element 61, the legs 62a and 62b of the field element 62 and the armature 67 to the south pole Y of the core 60. It is noted that this magnetic flux traverses the magnetic field structure in a direction opposite to that of the magnetic flux produced by the polarizing winding 76 and the permanent bar magnet 77. These opposing magnetic fluxes are ineffective to cause the armature 67 to be attracted to the pole face 60a of the core 60. Thus, the armature 67 is not rotated in a clockwise direction about the pivot pin 66 to move the contact spring 71 into engagement with the contact spring 70. Thus, it will be understood that this control device is of the polarized type and is operative only in the event the operating winding 75 thereof is energized with a current of a predetermined polarity, the position of the armature 67 with respect to the core 60 being controlled in accordance with the algebraic sum of the fluxes traversing these elements.

Moreover, it is noted that when the operating winding 75 is energized with a current of the opposite polarity effective to cause the polarity Y of the core 60 to be a south pole, the magnetic flux traversing the armature 67 of the field structure at this time is by-passed around the permanent bar magnet 77 by way of the portion of the armature 67 adjacent the permanent bar magnet 77. Thus, this magnetic flux opposing the magnetic fluxes produced by the polarizing winding 76 and the permanent bar magnet 77 is not forced through the permanent bar magnet. Accordingly, there is substantially no tendency for the permanent bar magnet 77 to become deenergized when the fluxes produced by the operating winding 75 and those produced by the polarizing winding 76 and the permanent bar magnet 77 traverse the field structure in opposite directions or oppose each other. Hence, the portion of the armature 67 disposed adjacent the permanent bar magnet 77 is effective to prevent demagnetization of the permanent bar magnet when the operating winding 75 is energized with a current of the opposite polarity effective to cause this winding to produce a flux in the field structure in opposition to the fluxes produced therein by the polarizing winding 76 and the permanent bar magnet 77.

In Figs. 7 and 8 of the drawing a further modified form of the control device is shown which comprises a magnetic field structure including a field element or core 80, a substantially U-shaped field element 81, one leg 81a of which is secured to the core 80 intermediate the ends thereof, and a substantially L-shaped field element 82, one leg 82a of which is secured to one end of the core by a screw 83. The other leg 81b of the field element 81 is arranged in spaced relationship with respect to a pole face indicated at 80a of the core 80 and the other leg 82b of the field element 82 extends substantially parallel to the core 80 and carries a bracket 84 adjacent the outer end thereof, the bracket being secured to the leg 82b by a screw 85. The bracket 84 is provided with two upwardly and outwardly extending arms 84a arranged in spaced parallel relationship and between which a pin 86 extends. An armature element 87 is arranged between the pole face 80a of the core 80 and the leg 81b of the field element 81 and is provided with two upwardly extending arms 87a arranged in spaced parallel relationship which are pivotally secured to the pin 86. Also, the armature 87 carries a rearwardly extending arm 88 provided with an insulating button 89 disposed on the outer end thereof. Apparatus comprising a contact spring assembly including a pair of cooperating contact springs 90 and 91 is secured to the leg 82b of the field element 82 by an arrangement comprising two screws 92 and a clamping washer 93. The contact springs 90 and 91 are insulated from each other and from the clamping washer 93 and the leg 82b of the field element 82 by a number of insulating plates 94, one of these insulating plates being arranged between each two of these elements.

The insulating button 89 disposed on the outer end of the arm 88 directly engages the contact spring 91 and is adapted to move this contact spring into engagement with the contact spring 90 in order to complete an electric circuit including the pair of contact springs 90 and 91 when the armature 87 is rotated in a clockwise direction, as viewed in Fig. 7, about the pivot pin 86. Also, it is noted that the contact spring 91 is formed of resilient material and is biased away from the contact spring 90, thereby to interrupt the electric circuit including this pair of contact springs and to bias the armature 87 in a counterclockwise direction about the pivot pin 86 away from the pole face 80a into a normal position.

An operating winding and a polarizing winding, respectively indicated at 95 and 96, are electromagnetically associated with the core 80, the operating winding 95 being associated with the core 80 between the pole face 80a and the leg 81a of the field element 81, and the polarizing winding 96 being associated with the core 80 between the leg 81a of the field element 81 and the leg 82a of the field element 82.

A permanent bar magnet 97 is directly secured in intimate contact with the edge of the field element 81 intermediate the legs 81a and 81b thereof by an arrangement comprising a strap 98 and a screw 99. The permanent bar magnet 97 is formed of a material having relatively high magnetic permeability and retentivity such, for example, as the alloys previously named. The permanent bar magnet 97 is so arranged that a south pole thereof is directed toward the leg 81a of the field element 81 and a north pole thereof is directed toward the leg 81b of the field element 81.

The terminals of the polarizing winding 96 are connected to a suitable source of direct current supply, thereby to cause this winding to be energized. The polarity of this source of direct current supply is such that when the polarizing winding 96 is thus energized, a magnetic flux is set up in the core 80 which causes the portion thereof adjacent the leg 81a to assume the polarity of a north pole and the portion thereof adjacent the leg 82a to assume the polarity of a south pole, thereby to cause a magnetic flux to traverse the field structure over a magnetic path extending from the north pole of the core 80 by way of the leg 81a, the leg 81b, the armature 87, the leg 82b and the leg 82a to the south pole of the core. Also, the permanent bar magnet sets up a magnetic flux which traverses two parallel magnetic paths. One of these parallel magnetic paths extends from the north pole of the permanent bar magnet 97 by way of the leg 81b of the field element 81, the armature 87, the legs 82b and 82a of the field element 82, a portion of the core 80 and the leg 81a of the field element 81 to the south pole of the permanent bar magnet. The other of these parallel magnetic paths extends from the north pole of the permanent bar magnet 97 by way of the adjacent portion of the field element 81 to the south pole of the permanent bar magnet, this magnetic path constituting a short-circuiting magnetic path for the permanent bar magnet. It is noted that the permanent bar magnet 97 has a sufficiently high permeability that a considerable magnetic flux produced thereby traverses the first-mentioned parallel magnetic path in spite of the fact that the second-mentioned parallel magnetic path constitutes a short-circuiting magnetic path for the permanent bar magnet. Also, it is noted that the magnetic flux produced by the polarizing winding 96 traverses the magnetic field structure in the same direction as the magnetic flux produced by the permanent bar magnet 97. These accumulative magnetic fluxes are effective to cause the armature 87 to be attracted to the leg 81b of the field element 81, thereby to bias the armature 87 in a counterclockwise direction about the pivot pin 86 away from the pole face 80a and into engagement with the leg 81b. Also, the armature 87 is biased away from the pole face 80a and into engagement with the leg 81b due to the resiliency of the contact spring 91. Accordingly, when the control device occupies a normal or non-operated position, the armature 87 is biased away from the pole face 80a of the core 80 into engagement with the leg 81b of the field element 81.

The terminals of the operating winding 95 are connected to a suitable source of direct current supply, thereby to cause this winding to be energized. When the operating winding is thus energized, a magnetic flux is set up in the core 80 which causes the end thereof, adjacent the pole face 80a, to assume a predetermined polarity Y and the portion thereof, adjacent the leg 81a, to assume a predetermined polarity X, the polarities X and Y being respectively north and south poles when the operating winding is energized with a current of one polarity, and the polarities X and Y being respectively south and north poles when the operating winding is energized with a current of the opposite polarity. When the operating winding 95 is energized with a current of one polarity so that the polarity Y of the core 80 is a north pole, a magnetic flux traverses the field structure over magnetic path extending from the north pole Y of the core 80 by way of the armature 87, the legs 82b and 82a of the field element 82, the portion of the core 80 disposed between the legs 82a and 81a to the south pole X of the core. It is noted that this magnetic flux traverses the core 80 in the same direction as the magnetic flux produced by the polarizing winding 96.

These accumulative magnetic fluxes are effective to cause the armature 87 to be attracted to the pole face 80a of the core 80, thereby to rotate the armature 87 in a clockwise direction about the pivot pin 86. When the armature 87 is rotated in a clockwise direction about the pivot pin 86, the insulating button 89 carried by the arm 88 moves the resilient contact spring 91 into engagement with the contact spring 90, thereby to complete the electric circuit including this pair of contact springs.

It is noted that when the armature 87 occupies a non-operated position, the polarizing winding 96 produces a magnetic flux which is effective to bias the armature 87 in a counterclockwise direction about the pivot pin 86 away from the pole face 80a and into engagement with the leg 81b of the field element 81. On the other hand, when the armature 87 is rotated in a clockwise direction about the pivot pin 86 away from the leg 81b of the field element 81 and into engagement with the pole face 80a, the flux produced by the polarizing winding 96 is effective to bias the armature 87 into engagement with the pole face 80a away from the leg 81b of the field element 81. Thus, the polarizing winding 96 produces a flux which biases the armature 87 toward the pole face 80a or toward the leg 81b of the field element 81 depending upon the one of these elements toward which the armature 87 is moved.

When the operating winding 95 is energized with a current of one polarity effective to cause the polarity Y of the core 80 to become a north pole, a magnetic flux also traverses the field structure by way of a magnetic path extending from the north pole Y of the core 80 by way of the armature 87, the leg 81b and the leg 81a to the south pole X of the core 80. It is noted that this magnetic flux produced by the operating winding 95 traverses the field element 81 in a direction opposite to that of the flux produced by the permanent bar magnet 97. However, this magnetic flux produced by the operating winding 95 is by-passed around the permanent bar magnet 97 by way of the portion of the field element 81 adjacent the permanent bar magnet 97. Thus, this magnetic flux opposing the magnetic flux produced by the permanent bar magnet 97 is not forced through the permanent bar magnet. Accordingly, there is substantially no tendency for the permanent bar magnet 97 to become demagnetized when the fluxes produced by the operating winding 95 and the permanent bar magnet 97 traverse the field structure in opposite directions or oppose each other. Hence, the portion of the field element 81 disposed adjacent the permanent bar magnet 97 is effective to prevent demagnetization of the permanent bar magnet when the operating winding is energized with a current of one polarity effective to cause the armature 87 to be rotated in a clockwise direction about the pivot pin 86.

When the operating winding 95 is deenergized, the flux produced by the polarizing winding 96 traversing the field structure is insufficient to retain the armature 87 in its operated position against the bias due to the resilient contact spring 91 and the bias produced by the permanent bar magnet 97. The bias produced by the permanent bar magnet 97 is caused by a flux produced thereby which traverses a magnetic path extending from the north pole of the permanent bar magnet 97 by way of the leg 81b of the field element 81, the armature 87, the legs 82b and 82a of the field element 82, the portion of the core 80 disposed between the leg 82a of the field element 82 and the leg 81a of the field element 81 and the leg 81a of the field element 81 to the south pole of the permanent bar magnet.

Thus, the armature 87 is positively biased in a counterclockwise direction about the pivot pin 86 by the permanent bar magnet 97 and the resilient contact spring 91, when the operating winding is deenergized. Accordingly the armature 87 is rotated in a counterclockwise direction about the pivot pin 86 away from the pole face 80a into engagement with the leg 81b of the field element 81. At this time the device occupies a non-operated position.

On the other hand when the operating winding 95 is energized with a current of the opposite polarity so that the polarity Y of the core 80 is a south pole, a magnetic flux is produced which traverses the field structure over a magnetic path extending from the north pole X of the core 80 by way of the portion of the core 80 disposed between the leg 82a of the field element 82 and the leg 81a of the field element 81, the legs 82a and 82b of the field element 82 and the armature 87 to the south pole Y of the core. It is noted that this magnetic flux traverses the magnetic field structure in a direction opposite to that of thre magnetic fluxes produced by the polarizing winding 96 and the permanent bar magnet 97. These opposing magnetic fluxes are ineffective to cause the armature 87 to be attracted to the pole face 80a of the core 80. Thus, the armature 87 is not rotated in a clockwise direction about the pivot pin 86 to move the contact spring 91 into engagement with the contact spring 90. Thus, it will be understood that the control device is of the polarized type and is operative only in the event the operating winding 95 thereof is energized with a current of a predetermined polarity, the position of the armature 87 with respect to the core 80 being controlled in accordance with the algebraic sum of the fluxes traversing these elements.

While there have been described what are at present considered to be the preferred embodiments of the invention, it will be understood that various modifications may be made therein, and it is intended to cover in the appended claims all such modifications as fall within the true spirit and scope of the invention.

What is claimed is:

1. A control device comprising a field structure including a permanent magnet, first and second field elements, and a movable armature disposed between said field elements; and an operating winding and a polarizing winding electromagnetically associated with said field structure; said field structure and said windings constituting means including said permanent magnet for normally restraining said armature toward said second field element, means including said operating winding when energized with current of a predetermined polarity for moving said armature toward said first field element, means including said polarizing winding when energized for biasing said armature toward the one of said field elements toward which it is moved by one of said two first-mentioned means, and means including said permanent magnet for returning said armature toward said second field element against the bias of said last-mentioned means after said operating winding is deenergized.

2. A control device comprising a magnetic field structure including a first field element, a second field element carried by said first field element intermediate first and second ends thereof and provided with an end disposed in spaced relation with respect to the first end of said first field element, a third field element supported by said first field element adjacent the second end thereof, a movable armature carried by said third field element and extending between the first end of said first field element and the end of said second field element, and a permanent magnet carried by said second field element; an operating winding electromagnetically associated with said first field element adjacent the first end thereof; and a polarized winding electromagnetically associated with said first field element adjacent the second end thereof; said field structure and said windings constituting means including said permanent magnet for normally restraining said armature toward the end of said second field element, means including said operating winding when energized with current of a predetermined polarity for moving said armature toward the first end of said first field element, means including said polarizing winding when energized for biasing said armature toward the end of the one of said field elements toward which it is moved by one of said two first-mentioned means, and means including said permanent magnet for returning said armature toward the end of said second field element against the bias of said last-mentioned means after said operating winding is deenergized.

3. A control device comprising a field structure including first and second field elements, a permanent magnet carried by one of said field elements, and a movable armature disposed between said field elements; and an operating winding and a polarizing winding electromagnetically associated with said field structure; said field structure and said windings constituting means including said permanent magnet for normally restraining said armature toward said second field element, means including said operating winding when energized with current of a predetermined polarity for moving said armature toward said first field element, means including said polarizing winding when energized for biasing said armature toward the one of said field elements toward which it is moved by one of said two first-mentioned means, means including said permanent magnet for returning said armature toward said second field element against the bias of said last-mentioned means after said operating winding is deenergized, and means including the portion of said one field element adjacent said permanent magnet for preventing demagnetization of said permanent magnet when said operating winding is energized to produce a flux in said one field element in opposition to the flux produced therein by said permanent magnet.

4. A control device comprising a field structure including first and second field elements, a permanent magnet carried by said second field element, and a movable armature disposed between said field elements; and an operating winding and a polarizing winding electromagnetically associated with said field structure; said field structure and said windings constituting means including said permanent magnet for normally restraining said armature toward said second field element, means including said operating winding when energized with current of a predetermined polarity for moving said armature toward said first field element, means including said polarizing winding when energized for biasing said armature toward the one of said field elements toward which it is moved by one of said two first-mentioned means, means including said permanent magnet for returning said armature toward said second field element against the bias of said last-mentioned means after said operating winding is deenergized, and means including a portion of said second field element for preventing demagnetization of said permanent magnet when said operating winding is energized to produce a flux in said second field element in opposition to the flux produced therein by said permanent magnet.

5. A control device comprising a magnetic field structure including a movable armature, a permanent magnet secured to said armature; and an operating winding and a polarizing winding electromagnetically associated with said field structure; said field structure and said windings constituting means for normally restraining said armature toward a predetermined position, means including said permanent magnet and said polarizing winding when energized for preventing movement of said armature away from said predetermined position when said operating winding is energized with current of one polarity, and means for causing movement of said armature away from said predetermined position when said operating winding is energized with current of the opposite polarity; said permanent magnet being carried by said armature and so secured thereto that both of the magnetic poles of said permanent magnet are in contact with said armature, whereby the portion of said armature adjacent to said permanent magnet constitutes a shunt for said permanent magnet for preventing demagnetization of said permanent magnet when said operating winding is energized to produce a flux in a predetermined portion of said field structure in opposition to the flux produced therein by said permanent magnet.

6. A control device comprising a field structure including first and second field elements, a permanent magnet secured to one of said field elements, and a movable armature disposed between said field elements; and an operating winding and a polarizing winding electromagnetically associated with said field structure; said field structure and said windings constituting means for normally restraining said armature toward a predetermined one of said field elements, means including said permanent magnet and said polarizing winding when energized for preventing movement of said armature away from said predetermined one field element when said operating winding is energized with current of one polarity, and means for causing movement of said armature away from said predetermined one field element when said operating winding is energized with current of the opposite polarity; said permanent magnet being carried by said one field element and so secured thereto that both of the magnetic poles of said permanent magnet are in contact with said one field element, whereby the portion of said one field element adjacent to said permanent magnet constitutes a shunt for said permanent magnet for preventing demagnetization of said permanent magnet when said operating winding is energized to produce a flux in said one field element in opposition to the flux produced therein by said permanent magnet.

CARL P. CLARE.
IRVIN W. COX.